United States Patent
Miskelly (10) Patent No.: US 9,674,637 B2
(45) Date of Patent: Jun. 6, 2017

(54) OBJECT MARSHALING

(75) Inventor: Gregg Miskelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 13/162,312

(22) Filed: Jun. 16, 2011

(65) Prior Publication Data

US 2012/0324479 A1 Dec. 20, 2012

(51) Int. Cl.
*H04W 4/00* (2009.01)
*G06F 9/44* (2006.01)

(52) U.S. Cl.
CPC .............. *H04W 4/00* (2013.01); *G06F 8/315* (2013.01)

(58) Field of Classification Search
CPC ............................ G06F 9/465; G06F 9/4428
See application file for complete search history.

(56) References Cited

U.S. PATENT DOCUMENTS

| | | | |
|---|---|---|---|
| 5,724,588 A | 3/1998 | Hill et al. | |
| 5,809,507 A | 9/1998 | Cavanaugh, III | |
| 6,044,409 A | 3/2000 | Lim et al. | |
| 6,553,377 B1 * | 4/2003 | Eschelbeck et al. | |
| 6,681,263 B1 * | 1/2004 | King | 719/315 |
| 7,130,885 B2 * | 10/2006 | Chandra et al. | 709/206 |
| 7,543,304 B2 | 6/2009 | Weedon et al. | |
| 7,600,223 B2 * | 10/2009 | Massarenti et al. | 717/152 |
| 2002/0004851 A1 * | 1/2002 | Matena et al. | 709/315 |
| 2002/0078077 A1 * | 6/2002 | Baumann et al. | 707/206 |
| 2002/0138582 A1 * | 9/2002 | Chandra et al. | 709/206 |
| 2002/0178298 A1 * | 11/2002 | Callsen | G06F 9/548 719/316 |
| 2003/0191783 A1 * | 10/2003 | Wolczko et al. | 707/206 |
| 2006/0070082 A1 * | 3/2006 | Sridhar et al. | 719/318 |
| 2006/0168023 A1 * | 7/2006 | Srinivasan et al. | 709/206 |
| 2006/0259489 A1 * | 11/2006 | Bernabeu-Auban et al. | 707/9 |
| 2007/0078855 A1 * | 4/2007 | Manolov | 707/10 |
| 2007/0288510 A1 * | 12/2007 | Dominguez et al. | 707/103 R |
| 2009/0138850 A1 * | 5/2009 | Yamaoka | 717/116 |
| 2010/0153460 A1 * | 6/2010 | Baisley | 707/802 |
| 2011/0055137 A1 | 3/2011 | Proctor et al. | |
| 2011/0061052 A1 * | 3/2011 | Cullen et al. | 718/100 |
| 2011/0107297 A1 * | 5/2011 | Chandra et al. | 717/110 |
| 2012/0054362 A1 * | 3/2012 | Tsao et al. | 709/232 |

(Continued)

OTHER PUBLICATIONS

Cooperman, et al., "Marshalgen: A Package for Semi-Automatic Marshaling of Objects", Retrieved at <<http://citeseerx.ist.psu.edu/viewdoc/download?doi=10.1.1.85.417&rep=rep1&type=pdf>>, Proceedings of The 2003 International Conference on Internet Computing Retrieved Date: Apr. 4, 2011, pp. 6.

(Continued)

*Primary Examiner* — Charles E Anya
(74) *Attorney, Agent, or Firm* — Dicke, Billig & Czaja, PLLC (57) ABSTRACT

Object marshaling techniques in a marshaling system for computer networks are disclosed. A gesture is provided to the object marshaling system that a reference object has expired on a sender side and a target side when the reference object is closed. Parent and child relationships are recognized in a descendent reference object to the reference object. The descendent reference object closes when the reference object closes.

18 Claims, 4 Drawing Sheets

(56) References Cited

U.S. PATENT DOCUMENTS

2012/0197944 A1* 8/2012 Foti ............................ 707/798

OTHER PUBLICATIONS

Birrell, et al., "Network Objects", Retrieved at <<http://www.hpl.hp.com/techreports/Compaq-DEC/SRC-RR-115.pdf>>, SRC-Research Report, Feb. 28, 1994, pp. 56.

Miskelly, et a., "Reducing Network Trips for Remote Expression Evaluations", Retrieved at <<http://lcaweb/patentidea/Lists/Patents/InventorDisplayFormMyIdeas.aspx?ID=36642&role=0&source=http://lcaweb/patentidea/Pages/MyIdeas.aspx>>, Retrieved Date: Apr. 5, 2011, p. 1.

Miskelly, Gregg, "Method for Improving the Network Performance for complex distributed Applications", Retrieved at <<http://lcaweb/patentidea/Lists/Patents/InventorDisplayFormMyIdeas.aspx?ID=36889&role=0&source=http://lcaweb/patentidea/Pages/MyIdeas.aspx>>, Retrieved Date: Apr. 5, 2011, pp. 2.

* cited by examiner

OBJECT MARSHALING

BACKGROUND

Marshaling (or marshalling) is the process of transforming the memory representation of an object to a data format suitable for storage or transmission. Marshaling is a process that is used to communicate to remote objects with an object (such as a serialized object). It simplifies complex communication, using custom/complex objects to communicate instead of primitives. Once a marshaled object is sent to storage or transmitted, it can often be un-marshaled into the original object. Marshaling is typically used when data is moved from one program to another or between different parts of a computer program. Other marshaling scenarios include marshaling objects between garbage collection-based environments and reference counting-based environments.

One suitable use for marshaling objects is to transfer objects between components in a distributed computing application. Distributed computing applications are often deployed into environments having a multitude of different technologies and services that are used to form building blocks of the applications. A distributed application is typically comprised of a set of components, spread across tiers, which interact to perform work. Some applications run in a cloud-computing environment, others run on the premises of the entity or user, and others span these environments. Often, it is difficult to cleanly separate the various layers of the application between computers. For example, a given piece of functionality may be implemented in a client process for some scenarios, but in the server process for other scenarios. Further, the environment may change as an application evolves, the number of users change, or the locations of the users become dispersed.

One desirable characteristic of a distributed application is its ability to scale, or to cost-effectively change with the enterprise or user demand for services of the application. Typical object-based marshaling systems, however, can become inefficient when used in applications where distinctions between layers are blurred or are used on high latency networks such as the Internet and others, which can make scaling such systems difficult and introduce other issues.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to object marshaling techniques in a marshaling system. The disclosed methods improve the efficiency of marshaling objects, especially when relating to marshaling objects between computers, though some of the aspects of this invention can be useful in other marshaling scenarios such as marshaling objects between garbage collection-based environments and reference counting-based environment.

In one technique, a method provides for synchronizing the lifetimes of reference objects. For example, a gesture is provided to the object marshaling system that a reference object has expired on a sender side and a target side when the reference object is closed. Parent and child relationships are recognized in a descendent reference object to the reference object. The descendent reference object closes when the reference object closes. In addition, close notifications are queued until the marshaling system sends a network message. Still further, the value of immutable properties for reference objects are copied when the object is initially marshaled, and a network protocol format used for messaging where items can be added to the front part of the message so as to allow new objects to be created before marshaled calls are processed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
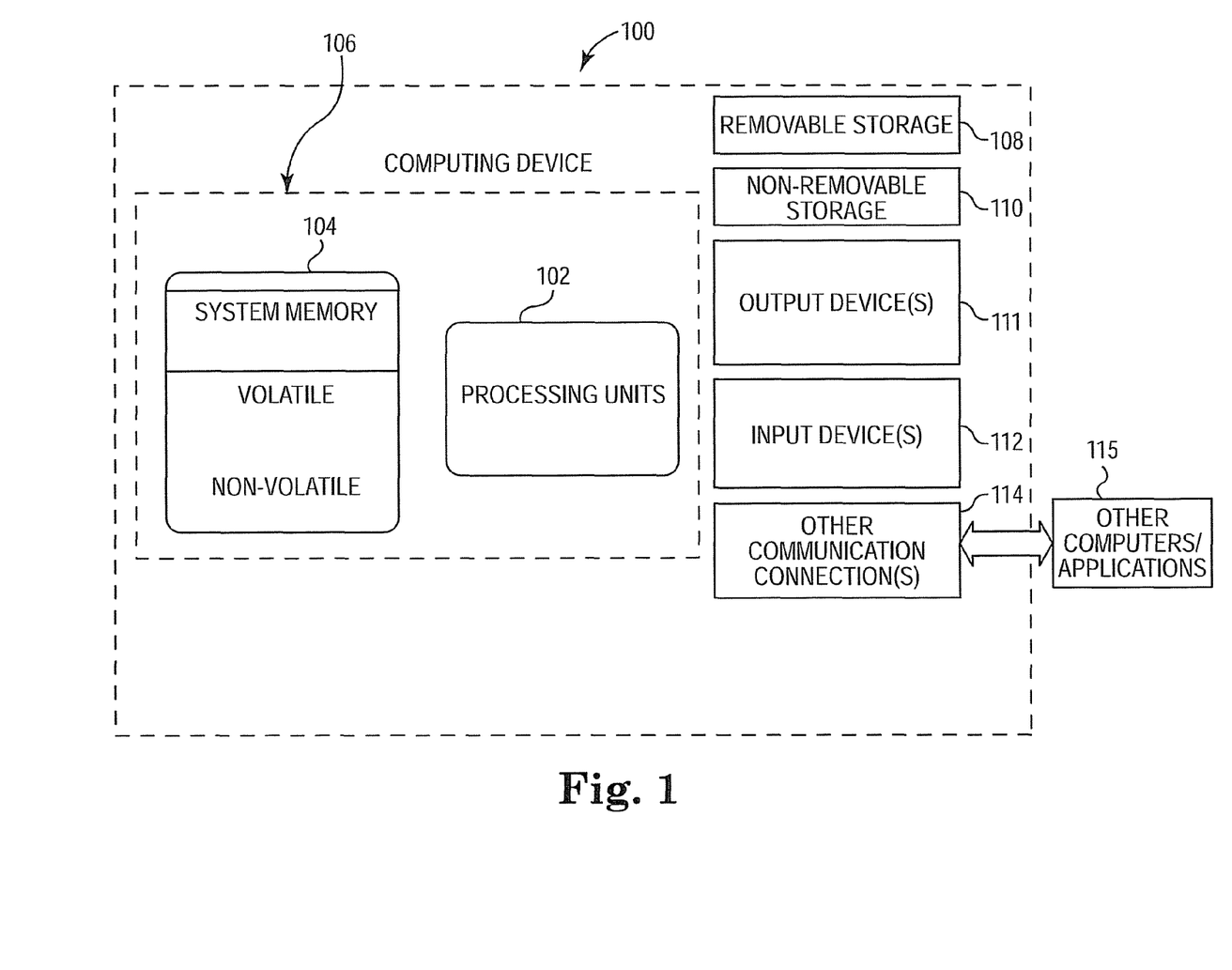
FIG. 1 is a block diagram illustrating an example computing device for running, hosting, or developing an object marshaling system.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), nonvolatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework sold under the trade designation .NET Framework available from Microsoft, Inc. of Redmond, Wash. U.S.A.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
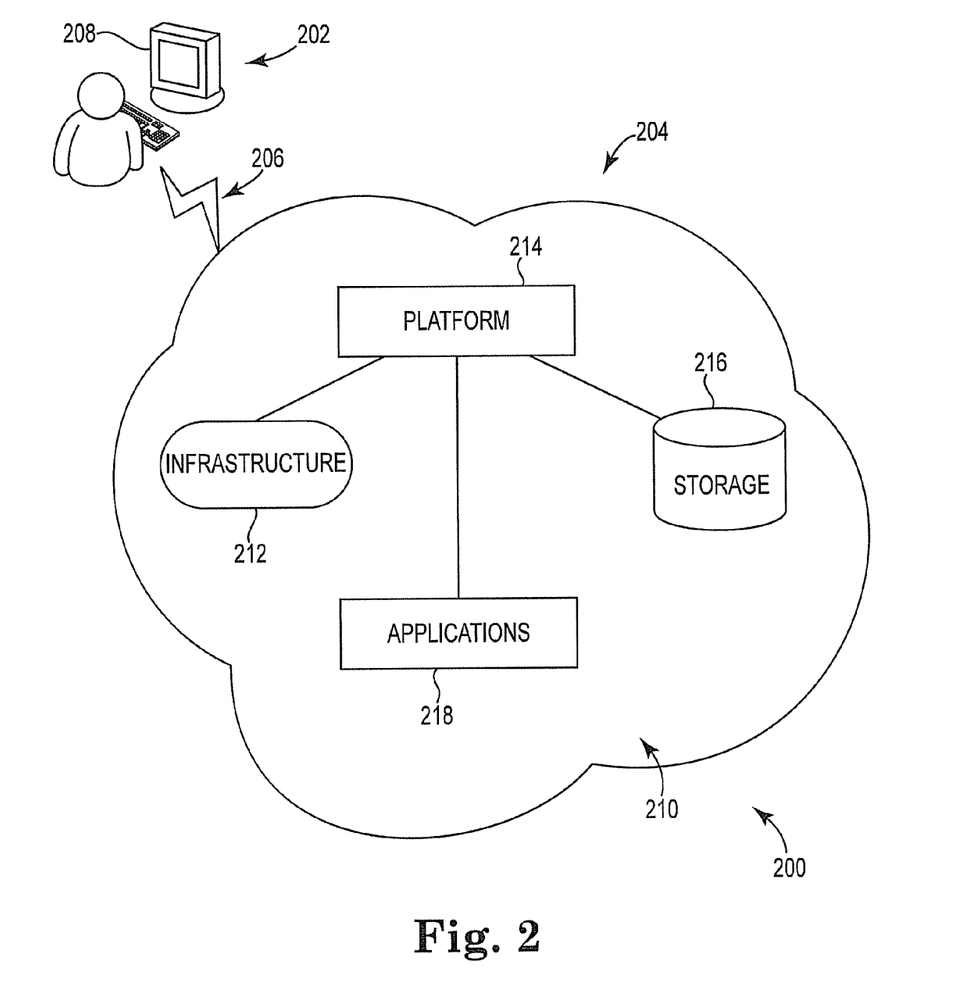
FIG. 2 is a schematic diagram illustrating an example of a computer network including a computing device of FIG. 1 interconnected with other computing devices.

FIG. 2 is a schematic diagram illustrating one example of a computer network, which is often referred to as cloud computing system 200. Typically, the cloud computing system 200 includes a front end 202, often referred to as client, and a back end 204, often referred to as the cloud. The front end 202 and the back end 204 are coupled together through a network 206, such as the Internet. The front end 202 and back end 204 can also be located on premises or limited to a particular enterprise. In still another example, the environment can include both on premises and off premises components. The front end 202 includes client devices 208 that can be constructed in accordance with computing device 100 in one example. Each of the client devices 208 includes an application (not shown) running on the client device 208 to permit access the cloud computing system 200. In one example, the application can be a general-purpose web browser or the application can be a particular application having availability limited to clients of a particular cloud system. The back end 204 includes computing devices including servers and data storage systems coupled together to create the cloud portion of computing services.

In one example, a cloud architecture 210 includes an infrastructure 212, an application platform 214 (such as a Platform-as-a-Service), storage 216, and applications 218, coupled together to permit the client to access systems and information with out having to purchase or maintain the underlying software and hardware used to perform the services of the back end 204. Most cloud computing infrastructures includes services delivered through common centers and built on servers. The application platform 214 allows applications to be hosted and run at one or more typically remote datacenters. In one example, the datacenters can themselves include forms of distributed computing such as computing clusters and storage. The application platform 214 can also provide a cloud operating system that serves as a runtime for the applications and provides a set of services that allows development, management and hosting of applications off-premises.

Services and applications 218 built using the platform 214 or for the platform 214 can run on top of the operating system. Generally, the operating system can include three components including compute, storage, and host. Compute provides a computation environment, and storage provides scalable storage, such as tables, queue, and so on, for large scale needs. The host environment can pool individual systems into a network for managing resources, load balancing, other services for the applications, and the like without using the hosted applications 218 to explicitly perform those functions. In one example, the cloud system can host a integrated development environment, such as one sold under the trade designation of Visual Studio available from Microsoft, Inc., where high computational and data intensive functions such as code debugging can be off loaded to a computer cluster in the back end 204.

The cloud computing system 200 is one example suitable for object marshaling. In this example, object marshaling can be applied within implementations of different marshaling, remoting, or remote procedure call mechanisms or systems, which transport data between computing resources in the cloud computing system 200, processes or instances of computer programs, and/or threads.

Figure 3:
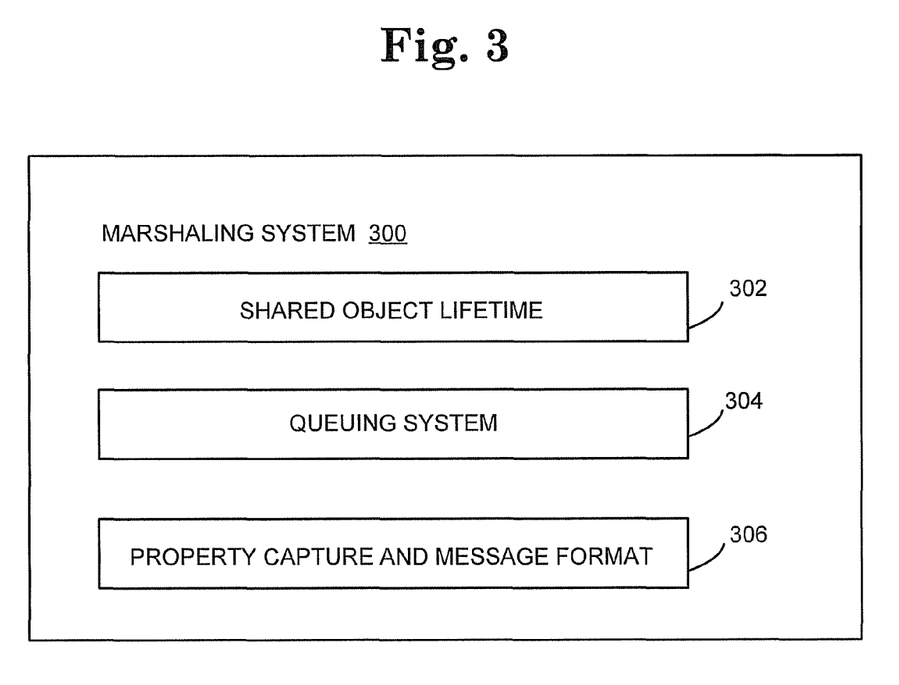
FIG. 3 is a block diagram illustrating an example marshaling system.

FIG. 3 illustrates an example marshaling system or remoting system 300 used to marshal objects between computing devices 100 such as within the cloud computing system 200. In one example, the marshaling system 300 can include features for marshaling objects included in messaging-oriented systems, remoting systems, or both. Message-oriented systems can provide efficient marshaling, and these systems do well when there is a strong divide between the responsibilities of each interconnected computing device. Distributed applications, however, often do not cleanly separate the various layers of the application between computing device. Message-oriented systems become less efficient in distributed applications where roles between network tiers can change. Further, message-oriented systems are difficult to reuse because they often rely on object marshaling application program interfaces (APIs) at the application level rather than in the message-oriented system. Object/interface-based remoting systems can include a complete object-based API, but they tend to have very inefficient network utilization, especially over high-latency networks (such as the Internet). Also, remoting systems may not provide the desired object lifetime semantics when marshaling objects between garbage collection-based environments and reference counting-based environment.

The marshaling system 300 can include marshaling of value objects or structures and reference objects. The marshaling of value objects or structures typically involves copying the value of properties, fields, or both. Properties of value objects can be made read-only because updates are typically not automatically marshaled, or can be other than read only. Reference objects maintain referential identity as part of marshaling. Each reference object includes an identifier that can be generated from the marshaling service, such as a Globally Unique Identifier (GUID), or an identifier supplied by the application, which is used to maintain a dictionary of objects in each execution environment of the object universe.

The marshaling system 300 can also make use of remoted methods, which are exposed by the marshaling system 300 to the application. Remoted methods can take marshalable objects as arguments and/or can define directly on the marshalable objects as member functions. The marshaling system implements the marshaling methods such that when the method is called, input parameters are wrapped up, a message is sent to a target system that provides the method call, the real implementation is invoked, and the outputs are sent back to the original system.

The marshaling system 300 includes features that allow for scaling in networks with latency. For example, the marshaling system 300 includes a feature to provide a shared object lifetime system 302 coupled to a queuing system 304. The shared object lifetime system 302 provides a method to close objects with an explicit gesture to an object remoting method of the marshaling system 300 that the objects are to be considered expired at both the sender and the target and on all sides of the object universe. The shared lifetime system 302 can also make the object marshaling system understand parent/child relationships in reference objects. The shared object lifetime system 302 will close child objects along when the corresponding parent object is closed. In one example of systems where multiple network connections are used, the parent objects cascade up to an object representing the transport connection so that if the connection is lost, all objects for this connection can be closed. The object lifetime system, in one example, is coupled to the queuing system 304 where close notifications can be queued. When an object is closed, the close notification can then be provided whenever the next network message request or reply is sent, which reduces network traffic and improves network efficiency.

To further improve network efficiency, the marshaling system 300 in one example can also include a property capture system 306 to provide a method to copy immutable properties for reference objects when the objects are first marshaled and not copy mutable properties. The method of the property capture system 306 can include a network protocol format that allows a "Reference Object Create" item to be added to the message, such as the front part of the message, to reduce extra round trips when the object is first marshaled.

Synchronizing the lifetime and expiration of reference objects includes several desirable aspects. Among these aspects include that synchronizing the lifetime of reference objects can promote identity comparison. Also, synchronizing the lifetime of reference objects and expirations allows the objects to return to private state in objects able to store private state because the system provides interface-based remoting, or because the remoted object exposes a property-bag collection.

A typical known implementation of object lifetime synchronization applies the normal object lifetime constructs of the execution environment for marshaled objects. For example, in a software framework such as one sold under the trade designation .NET available from Microsoft, Inc., marshaled objects could use the garbage collection feature to decide when an object is no longer used. Also, a component interface standard such as COM-based remoting uses a reference counting mechanism. The approach of the typical implementation tends to have at least two problems. First, because there is no strong gesture for marking the object as expired, it can be easy to introduce bugs that cause objects to remain much longer than desired. Second, when marshaling between a garbage collection system and a reference counting system, the garbage collection system can easily violate the expected lifetime semantics of the reference counting system, which can introduce bugs that can be difficult to track down.

The shared object lifetime system 302 introduces new traits of a class for the marshaling system 300. In one example of a trait, reference objects are provided with the close method, which is called to explicitly indicate the corresponding reference object is invalid throughout the marshaling system 300. In one example, the close method is called for each reference object, which reduces the chances of bugs due to incompatibilities between garbage collection systems and reference counting systems.

In another example of a trait, logical parent and child relationships between objects are introduced such that when the close method is called, related objects—such as descendent objects—are also closed. In one example, extra attributes are added to the object or the object type. For instance, custom attributes can be added to a program through the software framework, such as .NET Framework. In another instance, custom attributes can be included through a separate object definition language similar to an Interface Description Language (IDL) commonly used in remote procedure call software. Parent/child object relationships can be useful in remoting systems when a given execution environment can be connected to more than one other execution environment in a manner where the connections between environments can be lost.

The queuing system 304 provides a method to marshal the object close notifications of the shared object lifetime system 302. Certain object marshaling systems encounter situations where if more than a small amount of objects are destroyed, the program can block for excessive amount of time waiting for the destination computers to process the object destroy notifications. To provide the object close notification efficiently, this queuing system 304 extends the message format to have a 'close object' section of each message. The marshaling system will keep a list of objects that have been closed since the last time a message was sent to the destination system. This list can be constructed as a table in memory. When an object is closed, the marshaling system 300 determines to which networking systems the object was marshaled, and update the list for each connection where the object was marshaled to include this object. When the next message of any kind is sent to the target system, the list is added to the network message and removed from the connection object. Some implementations may also wish to provide a time limit that can automatically provide the delivery of the close notification if no other message is sent for a selected time threshold.

Object close notifications can include locking considerations. Problems can arise if the marshaling system 300 allows the application to define what the unique key is for a given reference object. For example, if one system reorders an object create notification ahead of an object close notification, the object create could fail because the key is already in use by the object which is about to be closed. To address this problem, the marshaling system 300 can use locks so the object create item is not processed ahead of the object close notification.

Reference objects in existing marshaling systems typically are marshaled on first use and then subsequent operations return to the same process. For example, properties on reference-marshaled objects can cause very poor performance. If a property get is a disguised blocking call to a network service, a programmer can readily add code that looks reasonable but will perform inefficiently or even terribly.

In order to address this problem, the marshaling system 300 is implemented to allow for new types of properties for reference objects where the values of the properties are not trivially obtained. In one example, the reference object can have immutable properties that do not change and durable properties that are expected to infrequently or rarely change. Durable properties can be implemented to provide a notification to the remoting system when a value is updated or changed. When a reference object is initially marshaled, the property capture system 306 will capture the value for these properties. Techniques for informing the marshaling system 300 of how to treat a property of the reference object can be made similar to informing the marshaling system 300 of parent/child objects.

An example implementation option of the property capture system 306 can include a network message format that has a collection of new objects that are to be created before any of the marshaled calls are processed. By having a separate section of the message devoted to new objects, the wire format for the 'call' or 'reply' section of the message can be the same in both the case that this message is the first time that the object is marshaled, or in the case that the object was previously marshaled. Having a separate section also eliminates the need to have dedicated messages that are sent before the 'call' or 'reply' message can be sent. The marshaling system 300 runs through the arguments to the method when a method call is processed. If a reference object has not yet been marshaled, the property capture system obtains the current value of the properties and uses the values to add a new object item to the request message. This process is recursive because marshaling an object will marshal all of the object properties.

If any of the properties values are also reference objects that have not yet been marshaled or imbedded reference objects, the imbedded reference are also added to the request message. The new object entry for the imbedded object is placed ahead of the new object entry for the original object. This is because the new object entry for the original object will reference the imbedded object. Similar to method calls, the wire format for the object reference can be made identical regardless of whether the object has been marshaled. The imbedded object can be made to appear earlier in the new object section of the message because it will be much less expensive to create the original object after the imbedded object is created. The target system can more efficiently perform tasks when the objects are ordered this way.

Multithreaded systems present additional issues with locking and new object items. The client system will append the new object item to the message if it is not been previously marshaled. Problems can arise when two messages are sent at approximately the same time, and the first message adds the new object item but the new object is thus omitted from the second message. For example, the target system could reverse the order of the messages such that the second message is processed before the new item notification and the second call will fail.

The marshaling system 300 takes steps to prevent processing of the second message until after the new object items are processed from previous messages. On the client side, one implementation option is to have a marshaling lock on each transport connection. The marshaling lock can be taken before deciding whether any reference object is to be marshaled into a corresponding specified connection. The marshaling system 300 would then work with the networking subsystem to preform message ordering, such as using a protocol like TCP/IP that provides ordering or by implementing ordering at the message level. The lock can be released after the send is in progress. The server side similarly processes new object items before processing the remainder of the message. One implementation option includes allowing each connection object to keep an object create collection and ensure that this collection is processed before processing the remainder of each message.

The following examples illustrate the features of the marshaling system 300.

```
abstractclassMyObject
{
publicMyObject(TransportConnection connection, int property1,
string property2)
{ }
// transport connection object used by the marshaling system to decide
// when to send requests that are on this method
publicTransportConnection Connection { get; }
// Used to uniquely identify each instance of this class
publicGuidUniqueId { get; }
// read-only properties of this class
publicint Property1 { get; }
publicstring Property2 { get; }
// method understood by the marshaling system 300 to close the
'MyObject'
// instance
void Close( ) { }
// marshaling stub method. The implementation of this method will call
// over to the server process, and execute
MyServer.MethodImplementation
    [Implementation("MyServer.MethodImplementation")];
abstractpublicint Method( );
};
```

A client process will create the object and have the marshaling system 300 send it into the server process:

```
class MyClient
{
public static void TalkToServer(TransportConnection connection)
    {
    var obj = newMyObject(connection, 12, "example value");
    obj.Method( );
    }
};
```

Figure 4:
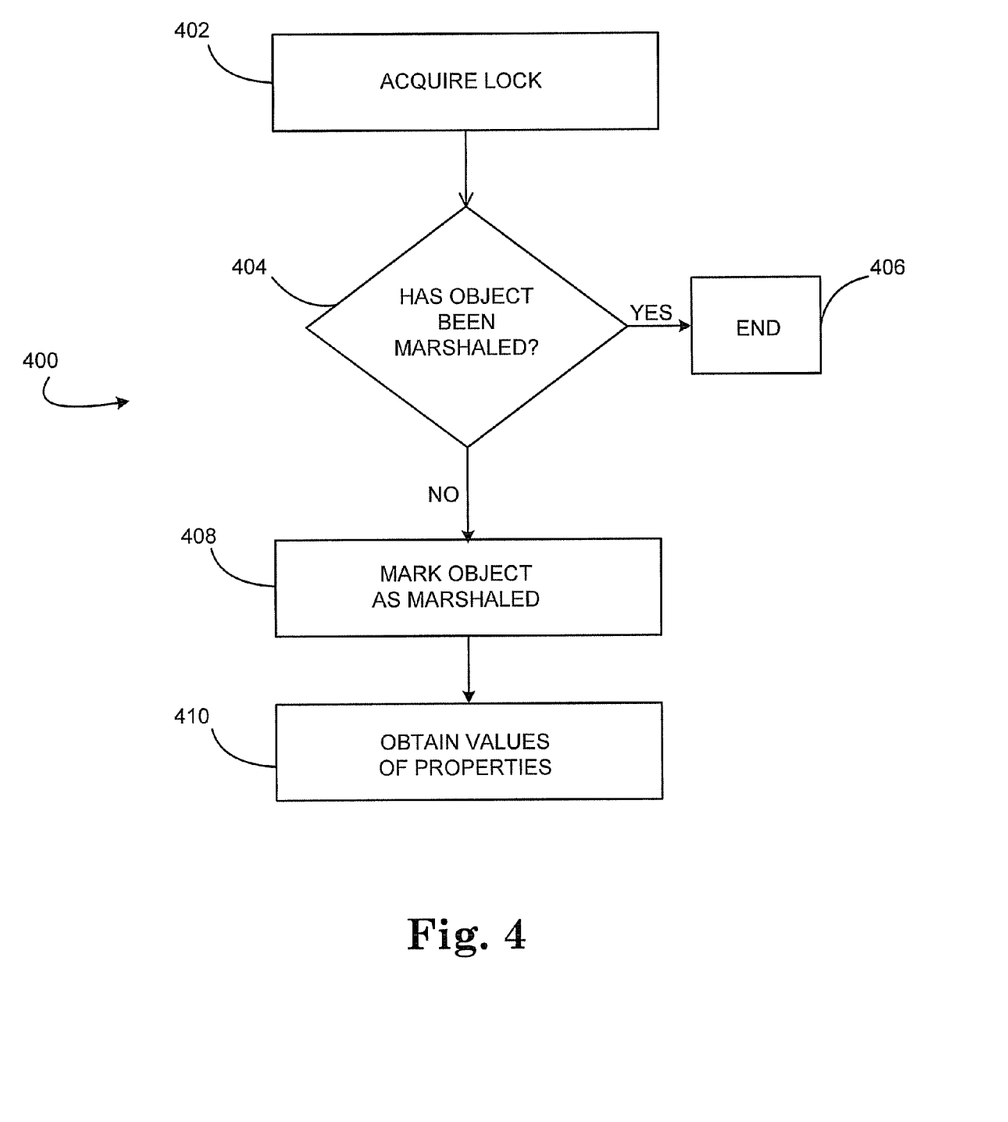
FIG. 4 is a block diagram illustrating an example method to marshal an object within the marshaling system of FIG. 3.

To marshal the call to obj.Method, the marshaling system will marshal "obj." FIG. 4 illustrates an example method 400 to marshal "obj." For example, a marshaling lock is acquired for obj. Connection, if the lock does not already exist at 402. If "obj" has already been marshaled to the connection at 404 proceed to end at 406. In the example, the "obj" has not been marshaled, so the method 400 proceeds to mark object as marshaled at 408. The value of the properties are obtained at 410, such as by calling the properties of UniqueId, Property1, and Property2. The item can be added into the 'NewObjects' section of the header at 412.

Now that "obj" has been marshaled, the marshaling system 300 can complete the marshaling for the call. The "obj" will be marshaled by its unique id value. An example request message sent over the wire can be declaratively expressed as:

```
<Request>
<NewObjects>
<MyObject>
<UniqueId>2b47c36a-d071-4284-8954-d3f297a86fac</UniqueId>
<Property1>12</Property1>
<Property2>example value</Property2>
</MyObject>
</NewObjects>
<ClosedObjects>
</ClosedObjects>
<Calls>
<MyObject.Method>
<MyObject>2b47c36a-d071-4284-8954-d3f297a86fac</MyObject>
</MyObject.Method>
</Calls>
</Request>
```

On the server side, the marshaling system 300 can process the request, and invoke the server. An example server follows:

```
class MyServer
{
public static int MethodImplementation(MyObject obj)
    {
    obj.Close( );
    return 0;
    }
}
```

In the example server above, the marshaling system 300 can perform two tasks. First, the marshaling system 300 will queue up the close notification when "obj.Close" is called on any other transport connection that might have seen or been subject to "obj." In present example, the client system is the only transport connection to have seen "obj." In this case, the server would update the close object queue in the connection with the client to include a MyObj instance with UniqueId=2b47c36a-d071-4284-8954-d3f297a86fac. Second, after "return 0," has executed, the result as well as information that "obj" was closed is marshaled back to the client process. The resulting reply can be declaratively expressed as:

```
<Reply>
<NewObjects>
</NewObjects>
<ClosedObjects>
<MyObject>2b47c36a-d071-4284-8954-d3f297a86fac</MyObject>
</ClosedObjects>
<CallReply>
<MyObject.Method>
<ReturnValue>0</ReturnValue>
</MyObject.Method>
</CallReply>
</Reply>
```

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of object marshaling, the method comprising:
providing a gesture to an object marshaling system that a reference object has expired on a sender side and a target side of execution environments of the object marshaling system when the reference object is closed, wherein the gesture explicitly indicates the expired reference object is invalid throughout the execution environments;
recognizing relationships in a transport connection for a descendent reference object in a separate execution environments from the reference object with a custom attributes connecting the reference object and the descendent reference object, wherein the descendent reference object closes in response to when the reference object closes; and
generating a locked close notification in an extended message format to close the reference object, wherein the locked close notification prevents processing of any object create items prior to processing the close notification, wherein closing the reference object includes cascading up to an object representing a connection when a connection between the sender side and the target side is lost; and
providing the close notification to the object marshaling system including delaying execution of the close notification until another message is sent to the target side after the reference object is closed, determining whether the another message was received, and, in response to the another message having not been received and a time threshold having been reached, delivering the close notification.

2. The method of claim 1 wherein the reference object includes an identifier.

3. The method of claim 2 wherein the identifier is provided by a marshaling service.

4. The method of claim 1 comprising remoted methods exposed to an application.

5. The method of claim 4 wherein the remoted methods take marshalable objects as arguments.

6. The method of claim 5 wherein the remoted methods define directly on the reference object as member functions.

7. The method of claim 1 wherein the marshaling system is used in a computer network.

8. The method of claim 7 wherein the computer network includes the Internet.

9. The method of claim 1 comprising:
including traits of calling a close method to explicitly indicate the reference object is invalid throughout the marshaling system.

10. The method of claim 9 comprising a plurality of reference objects, wherein the close method is called for each reference object in the plurality of reference objects.

11. The method of claim 1 wherein the attribute is included with an object definition language.

12. The method of claim 1 comprising:
copying immutable properties of the reference object when the reference object is initially marshaled.

13. A computer readable storage device, which does not include transitory propagating signals, to store computer executable instructions to control a processor to:
provide a gesture to an object remoting system that a reference object has expired on a sending side and a target side of execution environments of the object remoting system when the reference object is closed, wherein the gesture explicitly indicates the expired reference object is invalid throughout the execution environments;
recognizing relationships in a transport connection for a descendent reference object in a separate execution environments from the reference object with a custom attributes connecting the reference object to the descendent reference object, wherein the descendent reference object closes in response to when the reference object closes;
generate a locked close notification in an extended message format to close the reference object, wherein the locked close notification prevents processing of any object create items prior to processing the close notification, wherein closing the reference objects includes cascading up to an object representing a connection when a connection between the sender side and the target side is lost; and
provide the close notification to the object remoting system including delaying execution of the close notification until another message is sent to the target side after the reference object is closed, determining whether the another message was received, and, in response to the another message having not been received and a time threshold having been reached, delivering the close notification.

14. The computer readable storage device of claim 13 comprising:
extending a message format to include a close object section of each message sent with the system.

15. The computer readable storage device of claim 14 wherein the remoting system includes a list of objects closed since the last message sent.

16. A system of object marshaling, the system comprising:
a memory to store a set of instructions; and
a processor to execute the set of instructions to:
provide a gesture to an object marshalling system that a reference object has expired on a sending side and a target side of execution environments of the object marshaling system when the reference object is closed, wherein the gesture explicitly indicates the expired reference object is invalid throughout the execution environments;
recognize relationships in a transport connection for a descendent reference object in a separate execution environments from the reference object through a custom attributes connecting the reference object to the descendent reference object, wherein the descendent reference object closes in response to when the reference object closes;
generate a locked close notification in an extended message format to close the reference object, wherein the locked close notification prevents processing of any object create items prior to processing the close notification, wherein closing the reference objects includes cascading up to an object representing a connection when a connection between the sender side and the target side is lost; and
provide the close notification to the object marshaling system including delaying execution of the close notification until another message is sent to the target side after the reference object is closed, determining whether the another message was received, and, in response to the another message having not been received and a time threshold having been reached, delivering the close notification.

17. The system of claim 16 comprising copy an immutable property of the reference object when the reference object is initially marshaled.

18. The system of claim 17 wherein the immutable property is defined as an attributes in the reference objects.

* * * * *